United States Patent [19]

Nakagawa

[11] Patent Number: 4,694,949
[45] Date of Patent: Sep. 22, 1987

[54] ARTICLE SELECTING SYSTEM

[75] Inventor: Osamu Nakagawa, Nagaokakyo, Japan

[73] Assignee: Murata Kikai Kabushiki Kaisha, Japan

[21] Appl. No.: 738,943

[22] Filed: May 29, 1985

[30] Foreign Application Priority Data

May 29, 1984 [JP] Japan .................................. 59-108758

[51] Int. Cl.⁴ ...................... B65G 47/22; B65H 67/06
[52] U.S. Cl. ................................. 198/351; 198/465.1; 198/803.12; 209/656; 209/927; 242/35.5 A
[58] Field of Search ................ 209/3.1, 3.3, 539, 546, 209/608, 615, 619, 656, 658, 688, 927, 940; 198/340, 351, 354, 367, 465.1, 465.2, 803.01, 803.12; 57/281; 242/35.5 A

[56] References Cited

U.S. PATENT DOCUMENTS 1,693,014 11/1928 Anderson ............................. 198/354
2,346,285 4/1944 Beaulieu et al. ..................... 198/354
3,410,406 11/1968 Tsuda et al. ...................... 209/927 X
4,545,551 10/1985 Uchida et al. .................. 242/35.5 A

FOREIGN PATENT DOCUMENTS 55-119623 9/1980 Japan .................................. 209/927
59-61162 4/1984 Japan .
0888115 1/1962 United Kingdom ................ 198/354

Primary Examiner—Robert B. Reeves
Assistant Examiner—Edward M. Wacyra
Attorney, Agent, or Firm—Barnes, Kisselle, Raisch, Choate, Whittemore & Hulbert

[57] ABSTRACT

An article selecting system for sorting and discriminating a plurality of types of articles comprising a branch path provided intermediately of a transport path which transports n-types (n≧3) of different articles for sorting articles of the n-types into 2 types of articles and n−2 types of articles, a gauge located at a particular position on a transport path for the 2 types of articles for displacing the articles to two positions in accordance with the 2 types, and an article arrival detecting sensor and an article presence detecting sensor for indicating whether a specific article type in present. In one embodiment, two specific article types are allowed to progress along a selected path due to an overlappig coding feature of such two specific article types, while all other article types are diverted to a different path. In another embodiment in which there are three article types, one specific article type is allowed to progress along a selected path due to its particular coding, while the other two article types are diverted to a different path.

5 Claims, 13 Drawing Figures

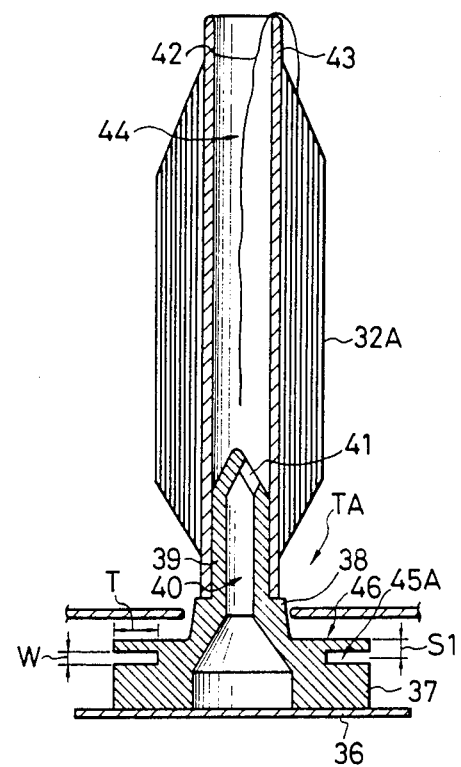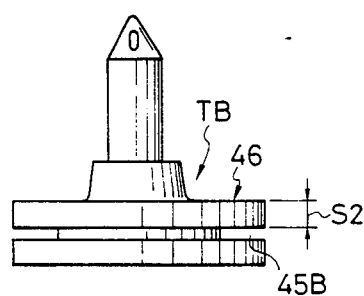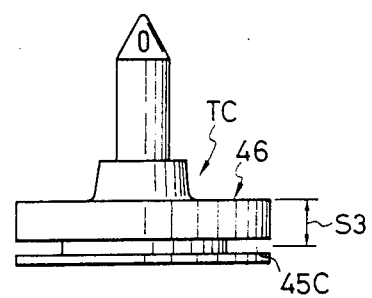

FIG. 9
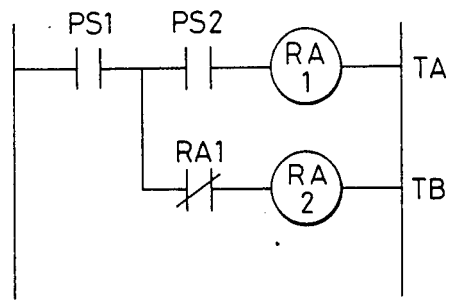
FIG. 10
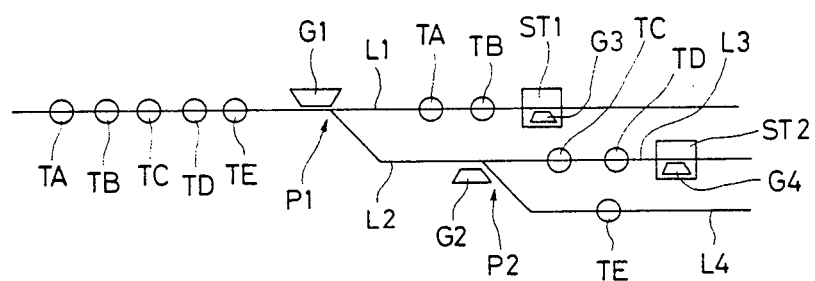
FIG. 11a    FIG. 11b    FIG. 11c
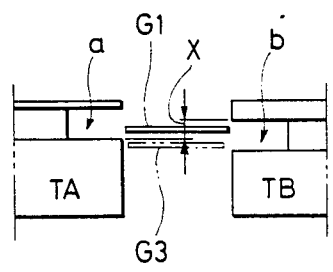 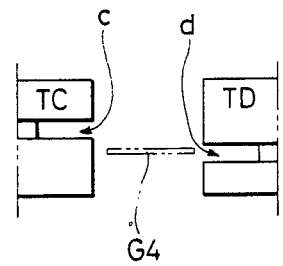 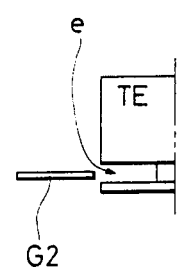

ARTICLE SELECTING SYSTEM

BACKGROUND OF THE INVENTION

1. Field of the Invention

This invention relates to an article selecting system, and more particularly to a selecting system wherein a plurality of types of articles are transported at random on a common transport path and are sorted for each type intermediately of the transport path for subsequent separate treating and transportation thereof.

2. Prior Art

For such a system as described above, various devices are known which include a type wherein same kinds of articles have, for example, same colors applied thereto so that a color of an article which comes to a selecting position is read by a mark sensor, another type wherein articles having different heights are read by photoelectric tube sensors located at different vertical positions, and so on. One of such types is suitably selectively employed depending upon articles to be transported.

However, a mark sensor for discriminating a color is still low in reliability and is unsatisfactory for application to an automatic transporting line. Accordingly, discrimination of different articles which have substantially a same configuration but are different in material, weight, color and so on from one another is impossible with such sensors as described above.

SUMMARY OF THE INVENTION

An object of the present invention is to provide a system wherein a plurality of types of articles are sorted and are assuredly discriminated on a transport path.

A system of the present invention includes a branch path provided intermediately of a transport path which transports n-types (n≧3) of different articles for sorting articles of the n-types into 2 types of articles and n−2 types of articles, a gauge located at a particular position on a transport path for the 2 types of articles for displacing the articles to two positions in accordance with the 2 types, and an article arrival detecting sensor and an article presence detecting sensor for indicating whether a specific article type is present.

BRIEF DESCRIPTION OF THE DRAWINGS

FIGS. 4 to 6 are sectional or front elevational views of trays of different types;

FIG. 9 a view illustrating an example of discriminating circuit;

FIG. 10 a diagrammatic representation illustrating an example of bobbin transporting system in which five types of articles are transported and treated; and FIGS. 11a, 11b and 11c are schematic illustrations showing a positional relation between a tray and gauge plate.

DETAILED DESCRIPTION OF THE INVENTION

Now, the present invention will be described in connection with an embodiment wherein it is applied to a transporting system for transporting bobbins discharged from an automatic winder which rewinds spinning bobbins with reference to the accompanying drawings.

Figure 2:
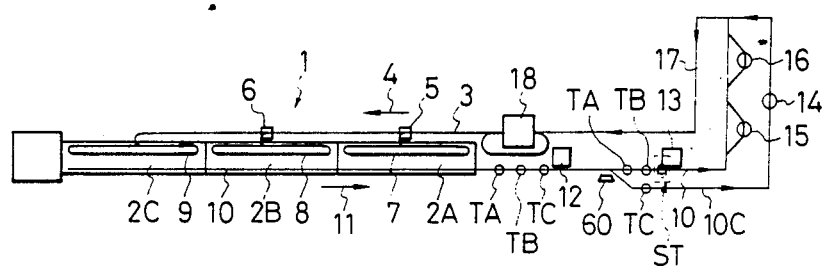
FIG. 2 a diagrammatic representation illustrating an example of bobbin transporting system to which the device of the invention can be applied.

Referring to FIG. 2, a winder 1 is substantially divided into three winding sections 2A, 2B and 2C for rewinding up to three types of yarns. Each of the winding sections 2A, 2B and 2C includes one or more winding units therein. For example, the winder 1 may include up to 60 spindles and be substantially divided into three winding sections including a section 2A for winding a yarn of the type A, another section 2B for winding a yarn of the type B and a further section 2C for winding a yarn of the type C.

As for supply of spinning bobbins to the winder, spinning bobbins are transported in integral relationship with transport media (hereinafter referred to as a tray) on a spinning bobbin supply path 3 and are sorted by selecting devices 5 and 6 so that they are supplied into spinning bobbin distributing paths 7, 8 and 9 each forming a closed loop in the corresponding sections 2A, 2B and 2C from the supply path 3. Meanwhile, empty bobbins from which yarns have been unwound at the respective sections or bobbins with remaining yarns thereon are discharged in integral relationship with trays from the winding sections onto a return path 10 along which they are transported in a direction of an arrow marked 11. Thus, empty bobbins, bobbins with remaining yarns and bobbins with minimum remaining yarns of the three types are transported at random on the return path 10, and at a first bobbin treating station 12, empty bobbins and bobbins with minimum remaining yarns of the type C are removed from their respective carriers and then, at a second bobbin treating section 13, empty bobbins and bobbins with minimum remaining yarns of the types A and B are removed. Trays for the type C thus empties then are supplied with new spinning bobbins at a spinning bobbin supply position 14 while trays for the type A are supplied with new spinning bobbins at a spinning bobbin supply position 15 and trays for the type B are supplied with new spinning bobbins at a spinning bobbin supply position 16. The trays having spinning bobbins of the three types thereon are then transported on a common transport path 17, and by a yarn end finding device 18, yarn ends are picked up and are each inserted into and depend from the top end of a center hole of the spinning bobbin. In this condition, the trays are transported to the winder.

Figure 3:
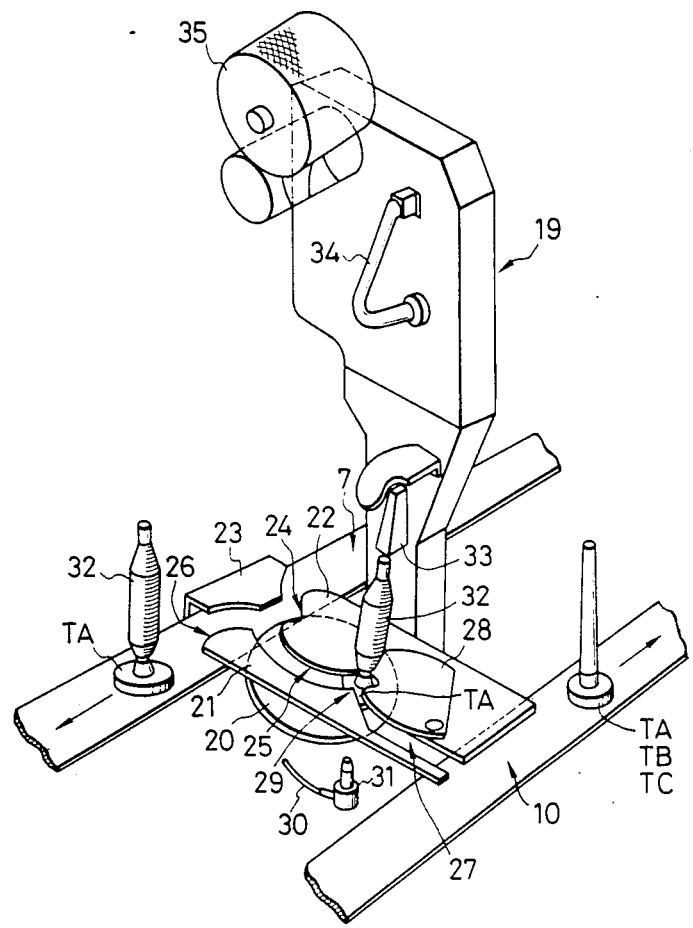
FIG. 3 a perspective view of a winding unit which can be applied to the system.

A winding unit which can be applied to the system described above is illustrated in FIG. 3. The winding unit 19 is located between the spinning bobbin distributing path 7 and the return path 10 and includes a rotary disk 20 and guide plates 21, 22 and 23 which define thereamong an inlet port 24 for taking in spinning bobbins from distributing path 7, a stand-by line 25, and so on. The rotary disk 20 is inclined slightly such that a side thereof adjacent the distributing path 7 is positioned higher than the other side thereof adjacent the return path 10. The guide plates 21 and 22 are secured to a frame and are located in a spaced relationship by a predetermined distance above from an upper face of the rotary disk 20. The guide plates 21 and 22 cooperate with the guide plate 23 to define therebetween the spinning bobbin inlet port 24 and a surplus spinning bobbin delivery port 26 while they define therebetween the spinning bobbin stand-by line 25 and a bobbin discharging line 27. A pivotal lever 28 is provided for discharging a bobbin at the winding position. Below the winding position 29, an air injection nozzle 31 is located and connected to a duct 30 connected to a compressed air supply source not shown. Compressed air injected from the nozzle 31 passes through a spacing within a peg of a tray TA and is injected into a winding pipe of a spinning bobbin from a blast nozzle perforated at an end portion of the peg to blow up an end of a yarn depending within the winding pipe. Located above a spinning bobbin 32 at the winding position are a balloon breaker 33, a relay pipe 34 for introducing an end of a yarn on a spinning bobbin to a yarn splicing device not shown, a suction mouth for introducing an end of a yarn on a winding package 35 to the yarn splicing device, a slub catcher for detecting a defect of a yarn, and so on.

A bobbin tray which constitutes a transport medium for transporting a spinning bobbin, an empty bobbin, and so on, which can be applied to the system as described above is illustrated in FIGS. 4 to 6. Referring to FIG. 4, a tray TA includes a base member 37 in the form of a disk to be placed on a conveyor 36, a stand portion 38 in the form of a post formed integrally on the base member 38 and having a diameter smaller than that of the base member 38, and a peg 39 formed integrally on and erected uprightly from an upper center of the stand portion 38. The tray TA has a spacing 40 formed therein and opened to a bottom face thereof while a hole 41 for injecting air therefrom is perforated in an inclined wall of a top portion of the peg 39. A spinning bobbin 32A is fitted on the peg of a tray TA with a lower end face thereof borne by a top face of the stand portion 38. In this condition, spinning bobbins are transported independently one by one together with respective trays.

An end 42 of a yarn picked up from a spinning bobbin 32A for splicing at a winding unit is inserted in a center hole of a winding pipe 43 and depends from the top end of the spinning bobbin while the bobbin is transported. Upon yarn splicing at the winding position of the winding unit, air injected from the nozzle 31 of FIG. 2 passes through the hole 41 from the internal spacing 40 of the tray and is injected into the center hole 44 of the winding pipe 43 to blow up the depending yarn end 42 externally from the center hole 44 so that it may be attracted to and held by the relay pipe at a stand-by position.

The tray TA has an annular groove 45A peculiar to an article formed on an outer circumferential periphery of the disk-formed base member 37 thereof for discriminating a spinning bobbin thereon. The groove 45A is formed over the entire outer circumferential periphery of the base member and extends annularly in an imaginary plane parallel to a direction of transportation of the tray TA. The groove 45A is formed as a groove having a width W and a depth T and spaced a distance S1 from an upper face 46 of the base member.

Accordingly, if the distance S1 of the groove 45A is differentiated for each type of spinning bobbins, the type of a spinning bobbin fitted on the tray can be discriminated. In particular, a tray TA as shown in FIG. 4 is a tray exclusively for a spinning bobbin 32A on which a yarn of the type A is wound while a tray TB as shown in FIG. 5 is a tray exclusively for a spinning bobbin 32B on which a yarn of the type B is wound with a groove 45B of the tray spaced a distance S2 from the top face 46, and a tray TC as shown in FIG. 6 is a tray exclusively for a spinning bobbin 32C on which a yarn of the type C is wound with a groove 45C of the tray spaced a distance S3 from the top face 46.

A device for discriminating trays of two types will now be described with reference to FIGS. 1, 7 and 8.

Figure 1:
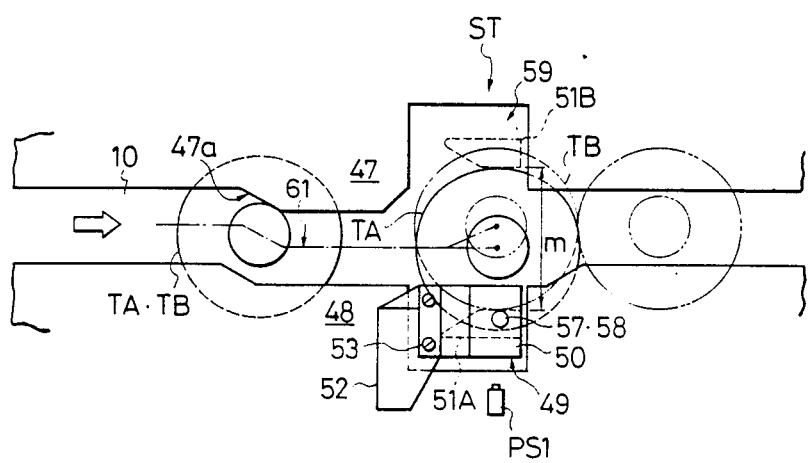
FIG. 1 is a plan view illustrating an embodiment of the present invention.
Figure 7:
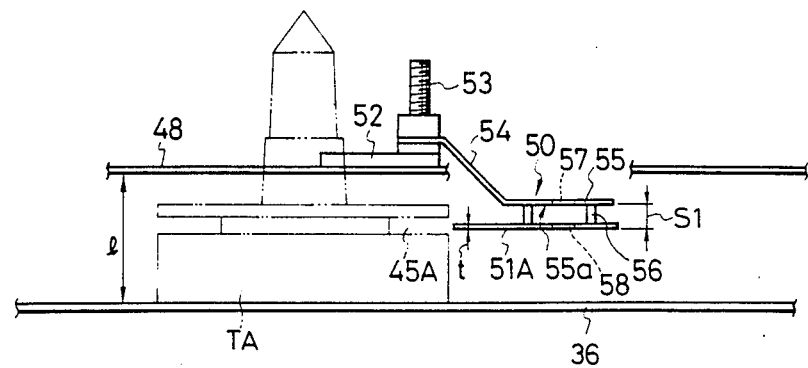
FIG. 7 a front elevational view of a selecting device.
Figure 8:
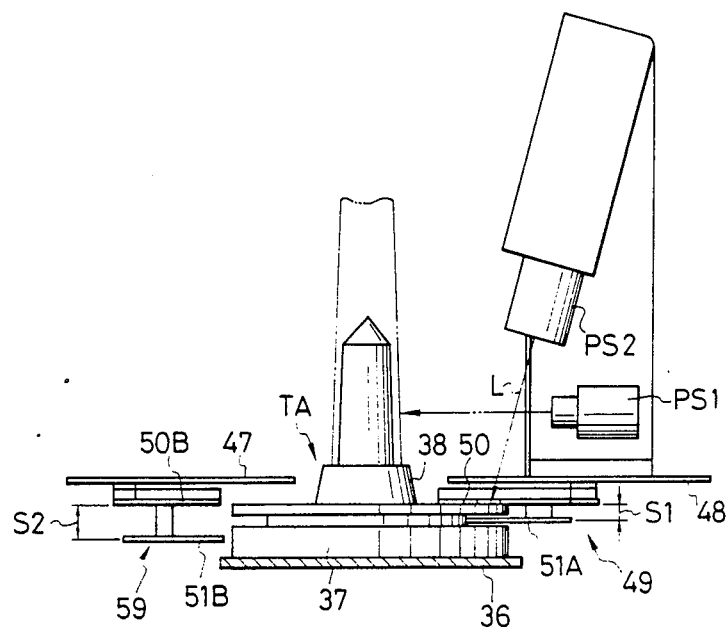
FIG. 8 a side elevational view of the selecting device.

FIGS. 1, 7 and 8 illustrate a device for discriminating two of the types of spinning bobbins which come to a discriminating station ST. In particular, the transport path 10 includes a conveyor belt 36 and a pair of guide plates 47 and 48 located a distance 1 above from an upper face of the conveyor belt 36. Thus, a lower face of the base member 37 is borne on the conveyor 36 and an outer circumferential face of the post-formed stand portion 38 is located between and guided by the guide plates 47 and 48 while it is transported.

At the discriminating station, a first tray discriminating member 49 is located in contiguous relationship to the guide plate 48. The discriminating member 49 includes a reference plate 50 located at a position spaced substantially a distance equal to the height of the base member 37 of a tray from an upper face of the conveyor, a gauge plate 51 secured in integral relationship with the reference plate 50 and in spaced relationship by a distance S1 below the reference plate 50, and a sensor PS1 for detecting presence or absence of a tray adjacent the gauge plate 51.

The reference plate 50 has one end fitted to a screw rod 53 on a bracket 52 secured to the guide plate 48 as seen in FIG. 7 and has an inclined section 54 for guiding a tray and a horizontal section 55 positioned to engage with the upper face of the base member of a tray. The reference plate 50 is mounted for slight rocking motion in a vertical direction so that the top face 46 of the base member of a tray may engage with a reference face 55a of the reference plate 50 irrespective of unevenness of the top face of the conveyor.

Meanwhile, the gauge plate 51A secured to the reference plate 50 by means of a screw 56 with a distance S1 left therebetween is formed from a thin plate having a thickness t sufficiently smaller than the width W of the groove 45A of a tray TA. Thus, if a tray having the groove 45A corresponding to the gauge plate 51A at height comes, the gauge plate 51A is admitted into the groove 45A and hence does not interfere with advancement of the tray, allowing the tray to pass thereby.

The reference plate 50 and the gauge plate 51A have holes 57 and 58 perforated therein, respectively, for passing light from a photoelectric tube sensor PS2 therethrough so that a beam of light L from the photoelectric tube sensor PS2 secured to the guide plate 48 may be irradiated onto and reflected by the top face of the conveyor 36. In particular, referring to FIG. 1, if a tray TB comes to a two dots and dash line position, a light beam is irradiated onto and reflected by the top face of the conveyor 36, but on the contrary if a tray TA comes to a full line position, the base member of the tray closes the hole 58 in the gauge plate 51A and hence the light beam is intercepted by the tray TA. Since the present embodiment in this way employs a photoelectric tube sensor of the reflective type, it is necessary that trays TA and TB of the two types and the conveyor 36 which come to the discriminating station be differentiated in color such that one of them has a color to reflect light and the other has a color to absorb light. For example, if the tray TA is blue and the tray TB is black, then the conveyor 36 may be white. It is to be noted that it is alternatively possible that the width of the conveyor belt 36 is made smaller than the diameter of a tray and a photoelectric tube sensor of the transmission type is provided to detect presence or absence of a tray depending upon if a light beam is intercepted or transmitted in accordance with two displaced positions of trays.

Further, it is also possible to provide a second discriminating member 59 at a position on the transport path in the opposite side to the first gauge plate 51A as seen in FIGS. 1 and 8. In particular, a gauge plate 51B at the position is secured in a position spaced a distance S2 below from a reference plate 50B, and the distance m between the gauges 51A and 51B is determined as a distance which meets a relationship that when a tray is displaced in a direction of the width of the belt by one of the gauges, the other gauge will be admitted into the groove of the tray thus displaced. In other words, two types of trays are assuredly displaced separately to the full line position TA and the two dots and dash line position TB of FIG. 1 by the gauges 51A and 51B at the two positions, respectively.

It is to be noted that, in the embodiment as described above, only trays of the types A and B as shown in FIGS. 4 and 5 are transported on the transport path 10 and the groove 45A of the tray TA corresponds to the first gauge 51A while the groove 45B of the tray TB corresponds to the second gauge 51B. Selecting operations of the device having such a construction as described above will be described below.

Referring to FIG. 2, bobbins of various types discharged from the sections 2A, 2B and 2C of the winder 1 onto the return path 10 are removed from individual trays such that empty bobbins and bobbins with minimum remaining yarns of the type C are removed at the first bobbin treating station 12 and then empty bobbins and bobbins with minimum remaining yarns of the types A and B are removed from their individual trays at the treating station 13.

A transport path 10C for the type C is branched from the return path 10 and transports empty trays TC for the type C to the new spinning bobbin supply station 14. Adjacent the branch path 10C, a plate 60 similar to the gauge plate as shown in FIGS. 1 and 7 is provided on the branch path side at a height same as the groove 45C of the tray TC in order to select trays TC for the type C from trays TA and TB for the types A and B. As a result, the trays TA and TB are transported on the return path 10 and advance to the treating station 13.

Trays TA and TB transported on the transport path 10 are discriminated in type by the discriminating device at a position forwardly of the treating station 13 of FIG. 2. Referring to FIG. 1, a tray TA or TB comes to the discriminating station ST under the guidance of the guide plates 47 and 48. In particular, the center of the tray moves along the locus of a dot and dash line 61 along an inclined face 47a, and since in case of the tray TA for the type A the gauge plate 45a is admitted into the groove of the tray TA, the tray TA of the type A comes to a position in which part of the base member thereof closes the hole 58 of the gauge plate 51A and hence the photoelectric tube sensor PS2 of FIG. 8 detects the tray TA. Meanwhile, if it is a tray of the type B, since it has no groove at the height of the gauge plate 45A, it is pressed at an outer circumferential periphery of the base member thereof by the gauge plate so that the tray TB is displaced to the two dots and dash line position TB. As a result, a light beam passes through the holes 57 and 58 is reflexed by a face of the conveyor. In this case, it is determined that there exists a tray of the type B at the discriminating station.

A signal obtained as a result of the discrimination is outputted to actuate a movable guide of a bobbin treating station. For example, such a signal is used as an input signal to operate a movable sorting guide to sort different types of empty bobbins removed from their individual trays by a vertically moving bobbin chuck in an apparatus disclosed in Japanese laid-open utility model No. 59-61162 which may be provided at the treating station 13 in order to throw the thus sorted empty bobbins onto a conveyor or into an empty bobbin storing box. In particular, referring to FIG. 9, if an article arrival detecting sensor PS1 detects arrival of a tray TA or TB at the discriminating station and is turned on thereby, then if the article presence detecting sensor PS2 detects the tray TA and has its contact PS2 turned on, a relay RA1 is energized to move the movable guide a predetermined position, but in case the sensor PS2 detects a tray TB, then the tray at the position is a tray for the type B and hence another relay RA2 is energized to move the movable guide to another predetermined position. In this way, empty bobbins removed from their individual trays can be sorted in accordance with their types.

It is to be noted that while the embodiment illustrates a device wherein n=3, for example in the case of N=5, that is, in the case articles of up to five types (A, B, C, D and E) are to be sorted, two types A and B may be sorted from the other three types C, D and E at a first branch path and are sorted from each other by each sensor while two C and D of the other three types C, D and E may be separated from the last type E and then discriminated from each other by means of a similar sensor to that of the embodiment. The remaining type may be automatically determined as the last article E.

Referring to FIG. 10 and FIGS. 11a, 11b and 11c, selecting operations for sorting bobbins of five types.

Trays TA and TB are respectively provided with discriminating grooves a and b which are formed to have width including a common part X to each grooves. The positions of grooves c, d and e formed on the trays TC, TD and TE, respectively, are differentiated for each type of spinning bobbins. Adjacent a branch point P1, a gauge plate G1 is provided at a height same as the common part X to the discriminating grooves a and b of the trays TA and TB. While, adjacent a branch point P2, a gauge plate G2 is provided at a height same as the discriminating groove e of the tray TE so that the gauge plate G2 can only advance into the groove e. As a result, the trays TA and TB pass through the gauge plate G1 at the branch point P1 and advance to a line L1. The other trays TC, TD and TE are pushed by the gauge plate G1 to be displaced toward a line L2. Thus, trays of five types transported on a transport path are sorted into trays of two types and trays of three types. The trays of two types are discriminated in type at a discriminating station ST1, for example, by means of a gauge G3 which can be admitted into only the groove a of the tray TA. The tray TB is displaced by the gauge G3 and the trays TA and TB are discriminated as mentioned hereinbefore. The trays TC, TD and TE of three types are sorted into trays of two types, that is, trays TC and TD, and a tray of one type, tray TE at a branch point P2. The trays which are transported on line L2 are sorted and discriminated in similar operations as mentioned above.

As apparent from the foregoing description, according to the present invention, articles can be selected or sorted by a selecting member secured to a fixed position without provision of a movable member. Thus, the device of the invention enables highly assured selection of articles, improving the reliability comparing with a mark sensor, a movable feeler, and so on. Thus, if the device of the invention is applied to an automatic transporting system, errors in transportation are eliminated effectively.

What is claimed is:

1. An article selecting system comprising a branch path and a gauge plate provided intermediately of a transport path which transports n-types (n≧3) of different articles for sorting articles of the n-types into two types of articles and n−2 types of articles, a second gauge plate located at a particular position on a transport path for the sorted two types of articles for displacing the articles to two positions in accordance with the two types, an article arrival detecting sensor and an article presence detecting sensor indicating whether a specific article type is present on said transport path for the sorted two types of articles.

2. An article selecting system wherein n-types (n≧3) of different articles are carried by different respective trays and the trays are transported on conveyor belt being guided by guides disposed along the conveyor belt, comprising a common transport path for transporting n-types of articles, a first path continuing from the common transport path via a branched point for transporting two types of articles, a second path branched from the common transport path at the branched point for transporting n−2 types of articles, a first discriminating device located at the branched point, and a second discriminating device located at a certain position on the first path for discriminating the two types of articles, a tray having an annular groove peculiar to an article carried thereon and formed on an outer circumferential periphery of a disk-formed base member thereof and said first discriminating device including a reference plate located at a position spaced substantially a distance equal to the height of the base member of the tray from an upper face of the conveyor and a gauge plate secured in integral relationship with the reference plate which may be admitted into the groove.

3. An article selecting system as claimed in claim 2, wherein said second discriminating device comprises a reference plate located at a position spaced substantially a distance equal to the height of the base member of the tray from an upper face of the conveyor, a gauge plate secured in integral relationship with the reference plate which may be admitted into the groove, an article arrival detecting sensor and an article presence detecting sensor for indicating whether a specific article type is present.

4. An article selecting system as claimed in claim 3, wherein said article presence detecting sensor is a photoelectric tube sensor and the reference plate and the gauge plate have holes perforated therein, respectively, for passing light from the photoelectric tube sensor.

5. An article selecting system as claimed in claim 3, wherein said second discriminating device further includes a second discriminating member comprising a second reference plate and a second gauge plate which is provided at a position on the transport path on the opposite side to the first gauge plate, said second gauge plate being secured in a position spaced by a distance as the second gauge plate may be admitted into a groove of the tray displaced when the tray is displaced by the first gauge plate.

* * * * *